(12) United States Patent
Takano et al.

(10) Patent No.: US 10,203,594 B2
(45) Date of Patent: Feb. 12, 2019

(54) PROJECTOR

(75) Inventors: Seiji Takano, Yokohama (JP); Hidenori Kuribayashi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 13/251,732

(22) Filed: Oct. 3, 2011

(65) Prior Publication Data

US 2012/0098865 A1 Apr. 26, 2012

(30) Foreign Application Priority Data

Oct. 14, 2010 (JP) ................................. 2010-231075
May 31, 2011 (JP) ................................. 2011-121266

(51) Int. Cl.
| | |
|---|---|
| G03B 21/26 | (2006.01) |
| G06F 3/042 | (2006.01) |
| G06F 3/01 | (2006.01) |
| H04N 9/31 | (2006.01) |

(Continued)

(52) U.S. Cl.
CPC ............. *G03B 21/26* (2013.01); *G06F 3/017* (2013.01); *G06F 3/0425* (2013.01); *G06F 3/0426* (2013.01); *G06F 3/04886* (2013.01); *H04N 9/3179* (2013.01); *H04N 9/3194* (2013.01); *G03B 21/28* (2013.01)

(58) Field of Classification Search
CPC ........ G03B 21/00; G03B 21/10; G03B 21/28; G09G 5/00
USPC .................................................. 345/660, 156
See application file for complete search history.

(56) References Cited

U.S. PATENT DOCUMENTS

| | | | | |
|---|---|---|---|---|
| 2005/0128185 A1* | 6/2005 | Wu et al. | ....................... | 345/156 |
| 2006/0290658 A1* | 12/2006 | Konuma | .............. | G03G 15/502 |
| | | | | 345/156 |

(Continued)

FOREIGN PATENT DOCUMENTS

| | | | |
|---|---|---|---|
| CN | 101796474 A | | 8/2010 |
| JP | 2006072854 A | * | 3/2006 |

(Continued)

OTHER PUBLICATIONS

Mar. 11, 2014 Office Action issued in Japanese Patent Application No. 2012-278124 (with translation).

(Continued)

*Primary Examiner* — Samantha (Yuehan) Wang
*Assistant Examiner* — Michael Le
(74) *Attorney, Agent, or Firm* — Oliff PLC

(57) ABSTRACT

A projector is provided with a projection unit that projects onto a projection surface a projected image that is based on image data; a detection unit that detects the direction of approach of an indication member or of the shadow of the indication member that has approached a detection region which includes the projected image; an icon memory unit that stores the image data of a plurality of icons; a decision unit that decides at least one of the display sizes of the icons, the display gaps between the icons, and the display positions of the icons, on the basis of the projection direction of the projected image and the direction of approach detected by the detection unit; and a projection control unit that projects the icons onto the display positions decided by the decision unit at the display sizes and display gaps decided by the decision unit.

18 Claims, 30 Drawing Sheets

(51) Int. Cl.
*G06F 3/0488* (2013.01)
*G03B 21/28* (2006.01)

(56) References Cited

U.S. PATENT DOCUMENTS

| | | | |
|---|---|---|---|
| 2007/0001874 A1* | 1/2007 | Feyereisen | G01C 23/00 340/995.1 |
| 2007/0174782 A1* | 7/2007 | Russo | G06F 3/04817 715/781 |
| 2008/0012824 A1* | 1/2008 | Grunnet-Jepsen | G06F 3/0421 345/156 |
| 2008/0211779 A1* | 9/2008 | Pryor | 345/173 |
| 2010/0093399 A1* | 4/2010 | Kim et al. | 455/566 |
| 2010/0188428 A1* | 7/2010 | Shin et al. | 345/661 |
| 2010/0238141 A1* | 9/2010 | Kanayama | G03B 17/54 345/179 |
| 2011/0164063 A1 | 7/2011 | Shimotani et al. | |
| 2011/0169746 A1* | 7/2011 | Kitajima | 345/173 |
| 2011/0302519 A1* | 12/2011 | Fleizach | G06F 3/03547 715/773 |

FOREIGN PATENT DOCUMENTS

| | | |
|---|---|---|
| JP | A-2006-236143 | 9/2006 |
| JP | A-2009-64109 | 3/2009 |
| JP | A 2009-64109 | 3/2009 |
| JP | 2009284468 A * | 12/2009 |
| WO | WO 2010/064387 A1 | 6/2010 |

OTHER PUBLICATIONS

Oct. 8, 2013 Office Action issued in Japanese Patent Application No. 2012-278124 (with English-language translation).
Jul. 3, 2014 Office Action issued in Chinese Patent Application No. 201110312252.4 (with translation).
May 14, 2015 Office Action issued in Chinese Patent Application No. 201110312252.4.

* cited by examiner

PROJECTOR

CROSS-REFERENCE TO RELATED APPLICATIONS

The disclosure of the following priority applications is herein incorporated by reference:
Japanese Patent Application No. 2010-231075 filed on Oct. 14, 2010; and
Japanese Patent Application No. 2011-121266 filed on May 31, 2011.

TECHNICAL FIELD

The present invention relates to a projector.

BACKGROUND ART

A known projection device projects operation icons onto a projection surface (for example, see Patent Literature 1). This projection device decides the projection position or projection direction of the operation icon in accordance with the direction of approach of a finger on the projected image.

CITATION LIST

Patent Literature

Patent Literature 1: Japanese Unexamined Patent Application Publication No. 2009-064109

SUMMARY OF INVENTION

Technical Problem

However, in the above-described projection device, the operation icon is sometimes shaded by the hand during operation, which may render operation difficult.

It is an object of the present invention to provide a projector in which the operation icon is easy to be seen, and which can be favorably operated.

Solution to Problem

The projector of the present invention includes: a projection unit that projects onto a projection surface a projected image that is based on image data; a detection unit that detects the direction of approach of an indication member or of the shadow of the indication member that has approached a detection region that includes the projected image; an icon memory unit that stores the image data of a plurality of icons; a decision unit that decides at least one of the display size of the icons, the display gaps between the icons, and the display positions of the icons, on the basis of the projection direction of the projected image and the direction of approach detected by the detection unit; and a projection control unit that projects the icons onto the display positions decided by the decision unit at the display sizes and display gaps decided by the decision unit.

The projector of the present invention is also characterized by being provided with a projection unit that projects onto a projection surface a projected image that is based on image data; an icon memory unit that stores the image data of a plurality of icons; a position memory unit that stores the display positions of the icons; a decision unit that decides at least one of the display size of the icons or the display gaps between the icons displayed along the projection direction of the projected image by a distance from the projection unit that is based on the display positions of the icons; and a projection control unit that projects each of the icons at the display sizes and display gaps decided by the decision unit.

The projector of the present invention is also characterized by being provided with a projection unit that projects onto a projection surface a projected image that is based on image data; a detection unit that detects the direction of approach of an indication member and the direction of approach of the shadow of the indication member that has approached a detection region that includes the projected image; an icon memory unit that stores image data of a plurality of icons; a decision unit that decides at least one of the display sizes of the icons, the display gaps between the icons, and the display positions of the icons, on the basis of the projection direction of the projected image and the direction of approach of the indication member and direction of approach of the shadow of the indication member detected by the detection unit; and a projection control unit that projects the icons at the display positions decided by the decision unit at the display sizes and display gaps decided by the decision unit.

Advantageous Effects of Invention

According to the projector of the present invention, the operation icons are easy to be seen and favorable operation is possible.

DESCRIPTION OF EMBODIMENTS

Figure 1:
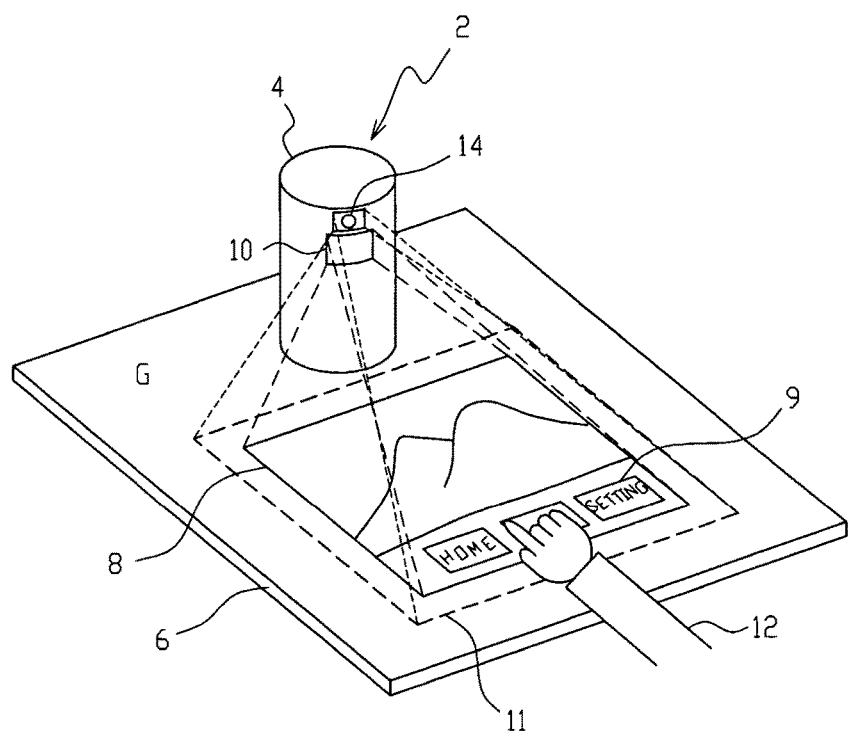
FIG. 1 is a perspective view depicting a projected state and a photographed state of a projector according to a first embodiment.

The following is a description of a projector according to a first embodiment of the present invention, with reference to the drawings. FIG. 1 is a perspective view depicting a projected state and a photographed state of a projector 2 according to the first embodiment. The projector 2 is provided with a casing 4 made of metal or plastic, the casing 4 being mounted onto a mounting surface G, which is the top surface of a desk 6 or the like. The front surface of the casing 4 is also provided with a projection window 10 that projects a projected image 8 and an operation icon 9 onto the mounting surface G, and with a photography window 14 that photographs an indication member such as a hand 12, which approaches a photography region 11 and indicates the operation icon 9.

Figure 2:
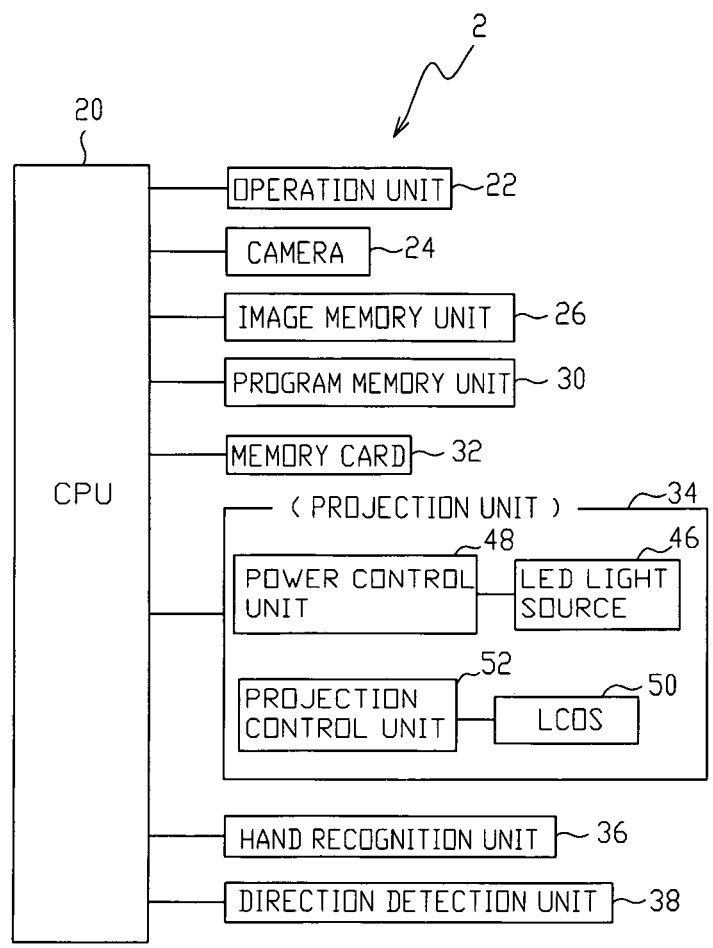
FIG. 2 is a block diagram depicting the configuration of the projector according to the first embodiment.

FIG. 2 is a block diagram depicting the system configuration of the projector according to the first embodiment. The projector 2 is provided with a CPU 20, the CPU 20 being connected to an operation unit 22 provided with a power switch and the like (not shown); a camera 24 having an imaging sensor constituted of a CCD or the like, that photographs a subject; an image memory unit 26 that stores image data of an image photographed by the camera 24; a program memory unit 30 that houses a program for setting and controlling photography, projection, and the like; a memory card 32 that stores the image data of an image to be projected; a projection unit 34 that projects an image that is based on image data stored in the image memory unit 26 or the memory card 32; a hand recognition unit 36 that determines whether or not a photographed image contains the shape of a hand 12; and a direction detection unit 38 that detects the direction in which the hand 12 approaches a photography region 11. Herein, the projection unit 34 is provided with a power control unit 48 that turns an LED light source 46 on and off, and with a projection control unit 52 that controls the display of an LCOS 50 that displays an image to be projected.

Figure 3:
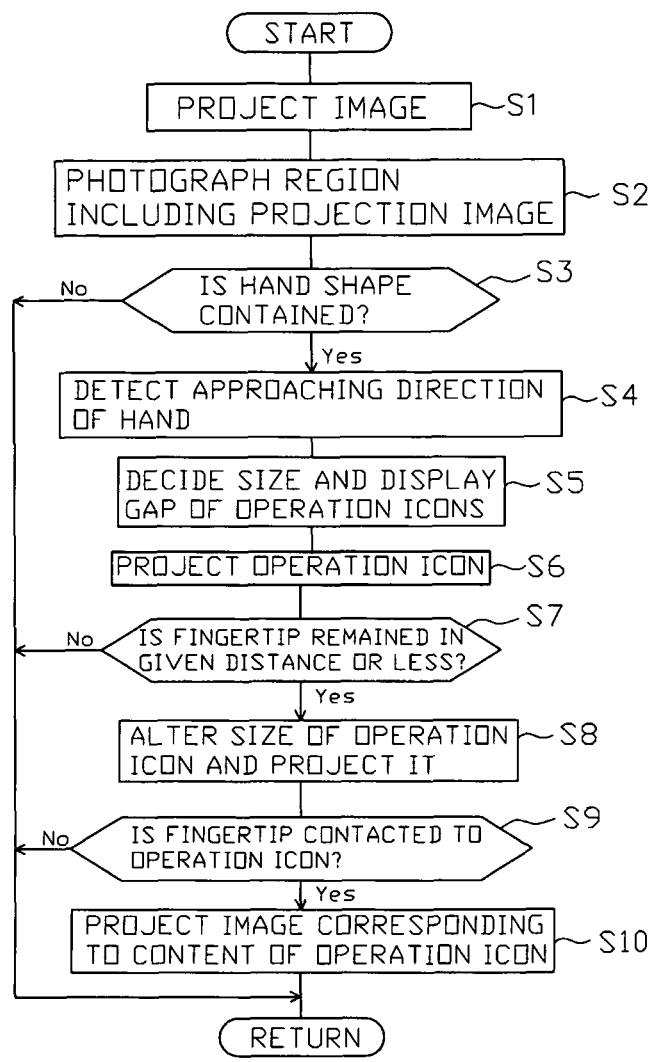
FIG. 3 is a flow chart depicting a process in the projector according to the first embodiment.
Figure 4:
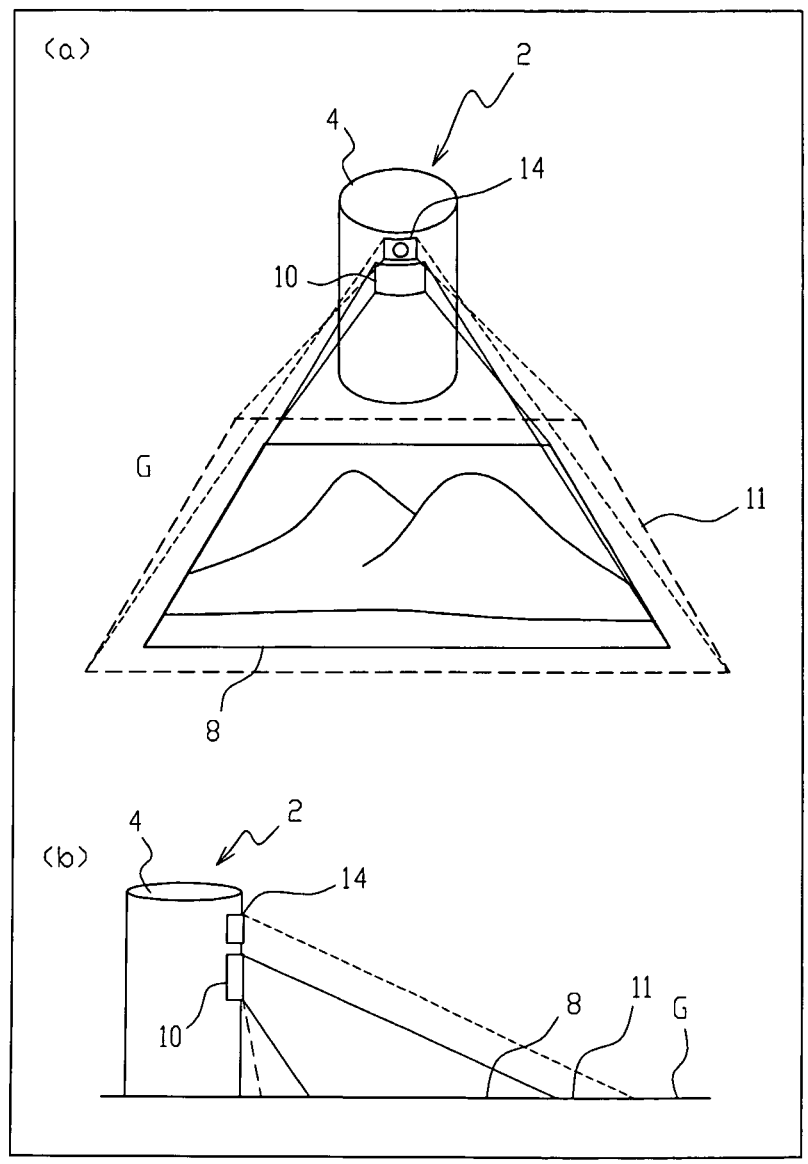
FIG. 4 is a front view and a side view depicting the projected state and the photographed state of the projector according to the first embodiment.

The following is a description of a process in the projector according to the first embodiment, with reference to the flowchart depicted in FIG. 3. First, as depicted in FIG. 4(a), the casing 4 is mounted onto a mounting surface G, and when the power is switched on, the CPU 20 indicates to the projection unit 34 to begin projecting, and reads out image data from the memory card 32 in order to use the projection control unit 52 to display on the LCOS 50 an image that is based on the image data. The power control unit 48 also switches on the LED light source 46 by the indication to begin projecting, and, as depicted in FIGS. 4(a) and 4(b), emits projection light in a downward-sloping direction from the projection window 10 so as to project the projected image 8 onto the mounting surface G (step S1).

The CPU 20 also uses the camera 24 to begin photographing a photography region 11 that includes the projected image 8 (step S2). Herein, the camera 24 photographs using video photography or still image photography at fixed time intervals, and image data of the image photographed by the camera 24 is stored in the image memory unit 26.

Next, the CPU 20 reads out image data from the image memory unit 26 and uses the hand recognition unit 36 to determine whether or not the image that is based on image data contains the shape of the hand 12 (step S3). Note that whether or not the image that is based on the image data contains the shape of the hand 12 is determined to detect the region of the hand 12 and the position of the fingertips from the image that is based on the image data by using pattern matching or the like.

Figure 5:
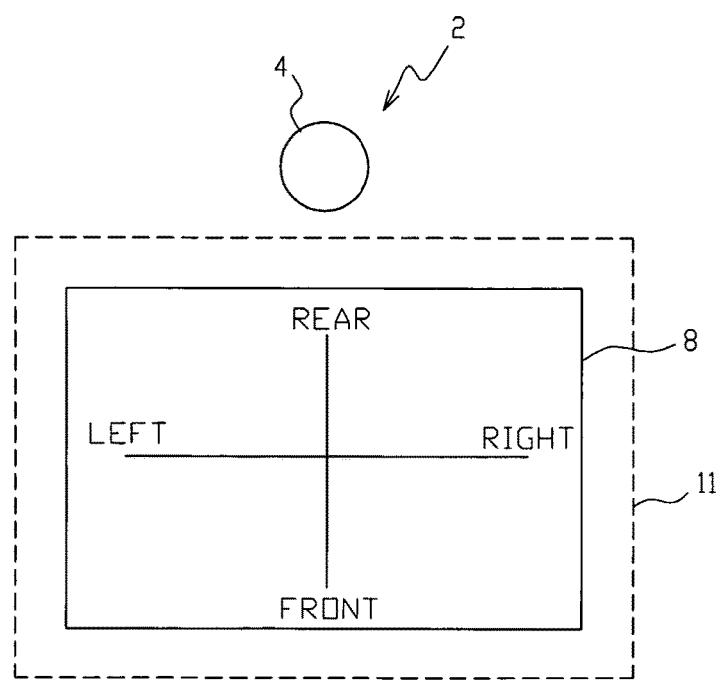
FIG. 5 is a diagram depicting a direction on a projected image of the projector according to the first embodiment.

Herein, FIG. 5 is a diagram overlooking from above onto the projector 2 mounted onto the mounting surface G and the photography region 11, which contains the projected image 8 projected onto the mounting surface G. As depicted in this FIG. 5, the rear is taken to be the side closer to the casing 4 of the projector 2 on the projected image 8, in the direction along the projection direction, and the front is taken to be the side farther away from the casing 4. Also, the right side is taken to be the right side on the projected image 8 in the direction orthogonal to the projection direction, and the left side is taken to be the left side thereof.

When the image that is based on the image data contains the shape of the hand 12 (step S3: Yes), the CPU 20 uses the direction detection unit 38 to detect from which of the directions depicted in FIG. 5 the hand 12 approaches the photography region 11 (step S4). On the other hand, when the image that is based on the image data does not contain the shape of the hand 12 (step S3: No), the CPU 20 returns to the process in step S1 without detecting the direction in which the hand 12 approaches.

Next, the CPU 20 determines whether the direction of approach of the hand 12 belongs to the front-rear direction or the left-right direction depicted in FIG. 5, and decides the sizes and display gaps of the operation icons 9 on the basis of the determined results (step S5). For example, when the hand 12 approaches from either the right side or the left side of the photography region 11, the size of the operation icons 9 is decided to be 2 cm×2 cm, and the gap between the operation icons 9 is decided to be 2 cm. Also, when the hand 12 approaches from either the front or the rear of the photography region 11, the size of the operation icons 9 is decided to be 4 cm×4 cm, and the gap between the operation icons 9 is decided to be 0.5 cm or the like.

Figure 6:
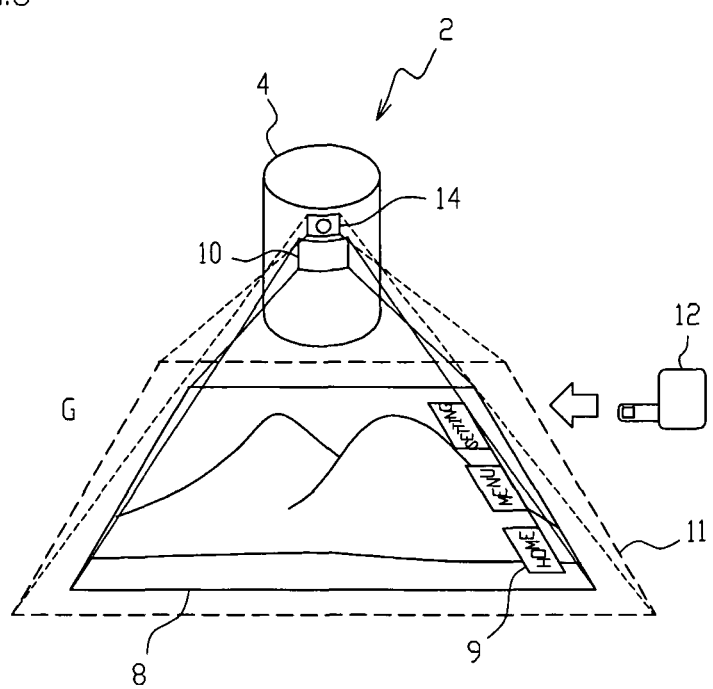
FIG. 6 is a diagram depicting operation icons superimposed and projected on the projected image by the projector according to the first embodiment, as well as a direction of approach of a hand.
Figure 7:
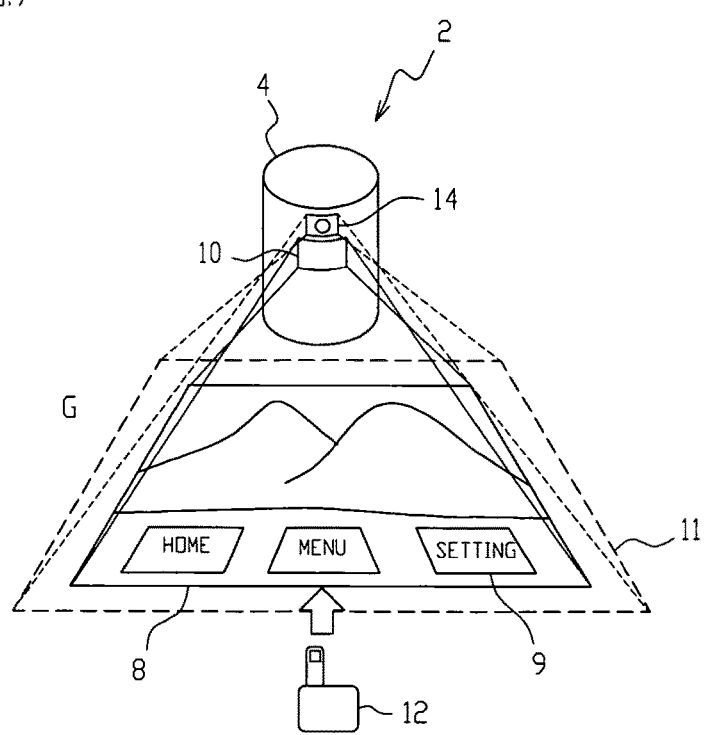
FIG. 7 is a diagram depicting the operation icons superimposed and projected on the projected image by the projector according to the first embodiment, as well as the direction of approach of a hand.

Next, the CPU 20 reads out the image data of the operation icons 9 from the program memory unit 30, and indicates to the projection unit 34 to project the operation icons 9 at the size and display gaps decided in step S5 along the edge part of the side of the projected image 8 in which the hand 12 approaches (step S6). For example, as depicted in FIG. 6, when the hand 12 approaches the photography region 11 from the right side, the operation icons 9 are projected along the edge part of the right side of the projected image 8 at the size and display gaps decided in step S5. Also, as depicted in FIG. 7, when the hand 12 approaches the photography region 11 from the front, the operation icons 9 are projected along the edge part of the front of the projected image 8 at the size and display gaps decided in step S5.

Figure 8:
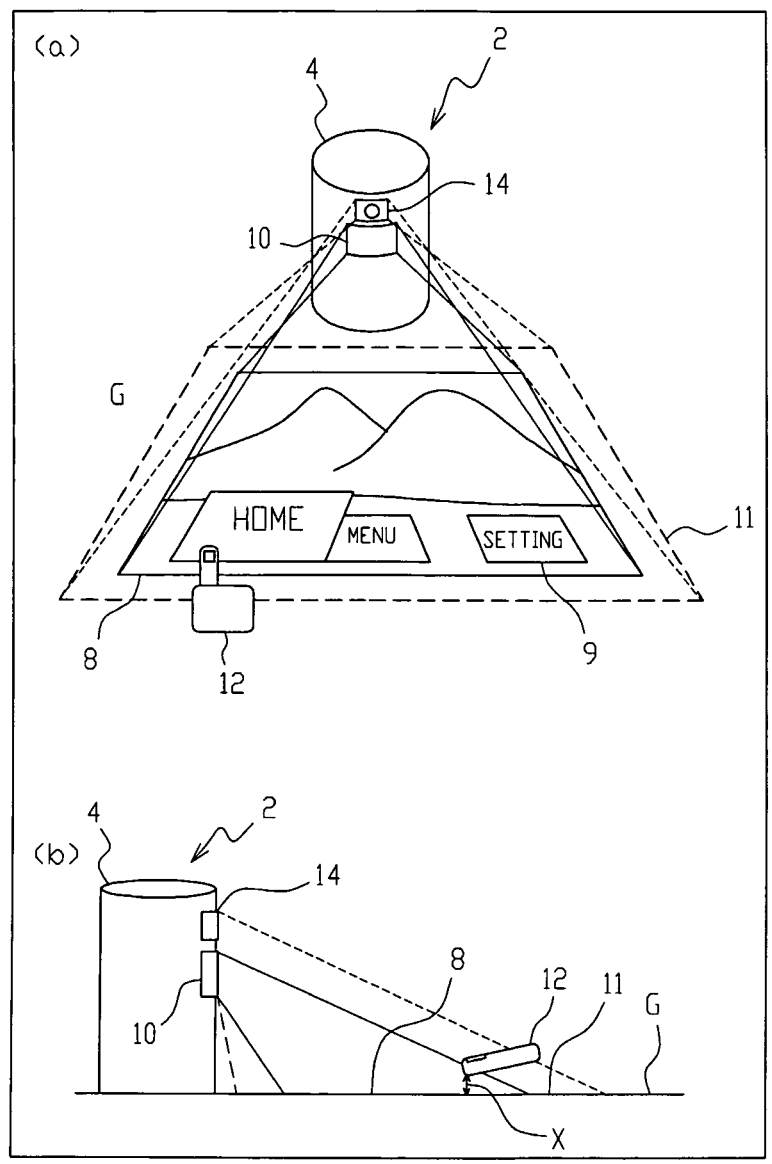
FIG. 8 is a diagram depicting the operation icons superimposed and projected on the projected image by the projector according to the first embodiment.

Next, the CPU 20 determines whether or not the distance from the operation icons 9 to the fingertip is a given distance or less (step S7). For example, as depicted in FIG. 8(*a*), the hand 12 approaching the photography region 11 from the front (see FIG. 5), the fingertip is taken as being located on an operation icon 9 "HOME." In this case, the CPU 20 measures a distance X of the normal direction from the mounting surface G to the position of the fingertip, depicted in FIG. 8(*b*) at the position of the operation icon 9 "HOME," on the basis of the image data, and determines whether or not the distance X of the normal direction is a given distance or less. Herein, the operator is able to set the given distance as desired.

When the distance X of the normal direction is the given distance or less (step S7: Yes), the CPU 20 alters the size of the operation icon 9 located directly under the fingertip, for example "HOME," to a larger size, and uses the projection unit 34 to project the large-sized operation icon "HOME" as depicted in FIG. 8(*a*) (step S8). On the other hand, when the distance X of the normal direction is greater than the given distance (step S7: No), the CPU 20 returns to the process of step S1 without altering the size of the operation icon 9.

Figure 9:
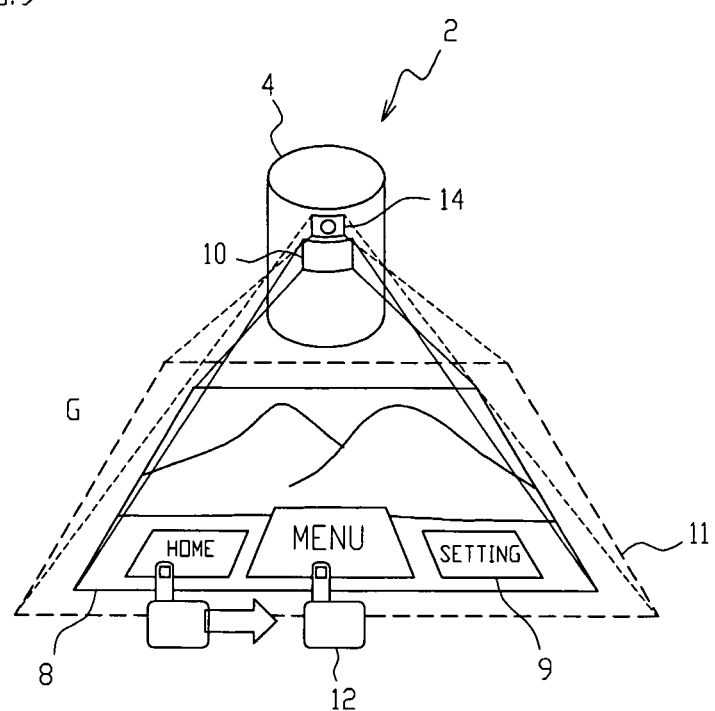
FIG. 9 is a diagram depicting the operation icons superimposed and projected on the projected image by the projector according to the first embodiment.

Herein, because the camera 24 uses video photography or the like to photograph and because the distance X of the normal direction is measured sequentially, when the fingertip is slid onto the operation icon 9 while the distance X of the normal direction is held at the given distance or less, as depicted in FIG. 9, the size of the operation icon 9 is altered along with the position of the fingertip.

Figure 10:
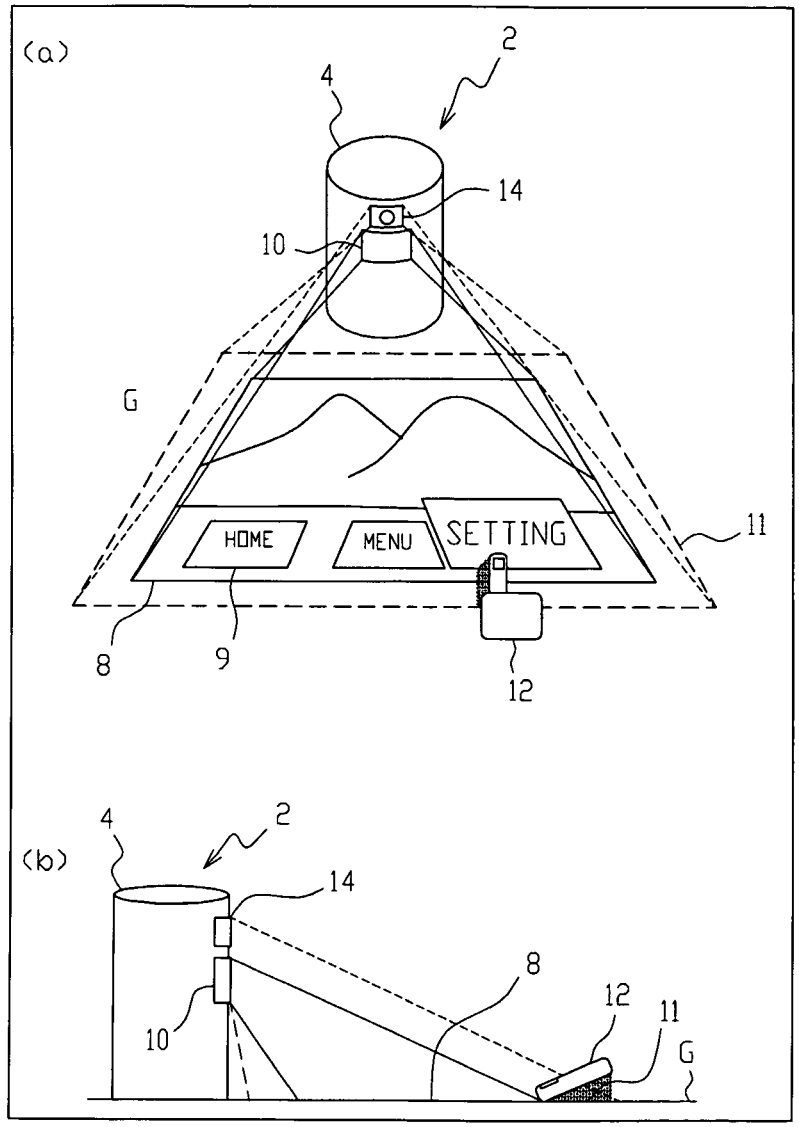
FIG. 10 is a diagram depicting the operation icons superimposed and projected on the projected image by the projector according to the first embodiment, as well as the position of a fingertip.

Next, the CPU 20 determines whether or not the fingertip has come into contact with the mounting surface G from the image data (step S9). For example, as depicted in FIGS. 10(*a*) and 10(*b*), when a fingertip located on an icon 9 "SETTINGS" comes into contact with the mounting surface G (step S9: Yes), the CPU 20 indicates to the projection unit 34 to project an image "SETTINGS SCREEN" for setting, for example, the brightness of the projected image 8, corresponding to the content of the operation icon 9 "SETTINGS" (step S10). On the other hand, when the fingertip does not come into contact with the mounting surface G (step S9: No), the CPU 20 returns to the process of step S1 without projecting an image corresponding to the content of the operation icon 9.

According to the projector 2 based on this first embodiment, because the icons 9 are projected at different sizes and display gaps in accordance with the direction of approach of the hand 12, the operation icons 9 are easy to be seen even in the region shaded by the hand 12, and favorable operation is possible. For example, when the hand 12 approaches from the right side or the left side (see FIG. 5) of the photography region 11, the operation icons 9 are projected along the edge part of the right side or the left side of the projected image 8 (see FIG. 6). In this case, because the operation icons 9 located farther to the front than the operation icon 9 indicated by the fingertip (see FIG. 5) is shaded by the hand 12, small-sized operation icons 9 are projected along the edge part of the right side or the left side of the projected image 8 at wide gaps, so as to have superior ease of being seen. On the other hand, when the hand 12 approaches from the front or the rear of the photography region 11 (see FIG. 5), the operation icons 9 are projected along the edge part of the front or the rear of the projected image 8 (see FIG. 7). In such a case, because the operation icons 9 adjacent to the indicated operation icon 9 are not shaded by the hand 12, large-sized operation icons 9 are projected along the edge part of the front or the rear of the projected image 8 at narrow gaps, so as to have superior operability.

Figure 11:
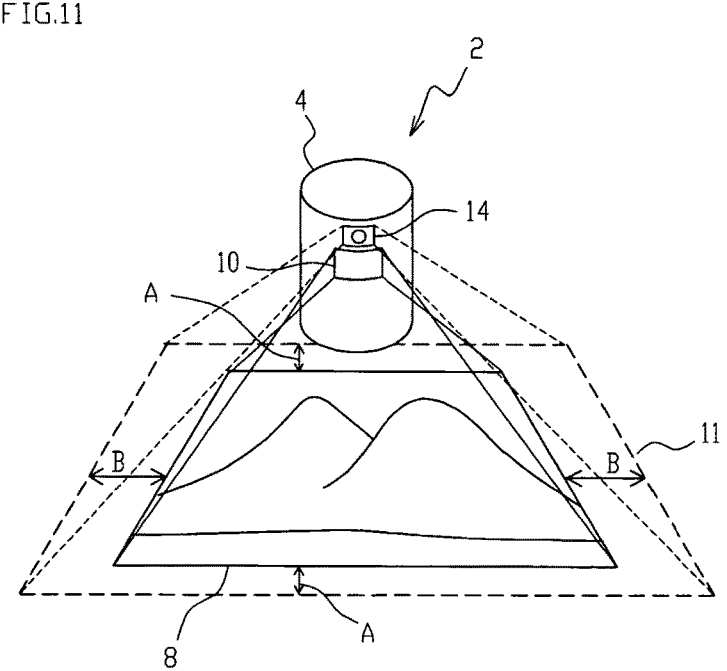
FIG. 11 is a diagram depicting a photography region in the projector according to the first embodiment.
Figure 12:
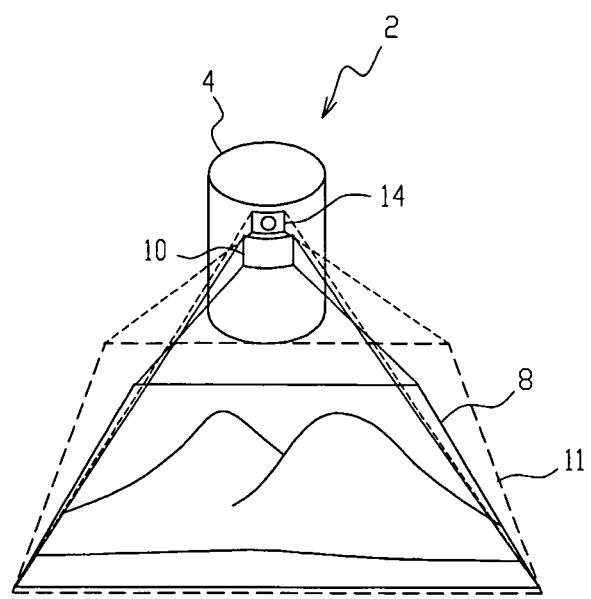
FIG. 12 is a diagram depicting the photography region in the projector according to the first embodiment.

Note that in the first embodiment, the width from the edge part of the projected image 8 to the edge part of the photography region 11 may be made to vary depending on the directions of the edge parts. For example, as depicted in FIG. 11, the width of A may be made to be narrower than the width of B. Also, as depicted in FIG. 12, the width from the edge part of the projected image 8 to the edge part of the photography region 11 may be made to become narrower as the distance from the casing 4 increases. The operation icons 9 being thereby projected prior to when the projected image 8 is shaded by the hand 12 when the hand 12 approaches from the right, the left, or the rear of the photography region 11 (see FIG. 5), the operator can recognize the position of the operation icons 9 earlier. Also, because the operation icons 9 located at the front of the projected image 8, which is less prone to being shaded by the hand 12 (see FIG. 5), are not projected until immediately before the hand 12 approaches the projected image 8, mistaken operations, such as when the operation icons 9 are projected when the hand 12 mistakenly comes close to the mounting surface G, can be prevented. Note that when the photography region 11 remains in the original state (see FIG. 10(*a*) and the like), the region in which the hand recognition unit 36 determines whether or not the image that is based on the image data contains the shape of the hand 12 may be altered like the photography region 11 depicted in FIGS. 11 and 12.

Figure 13:
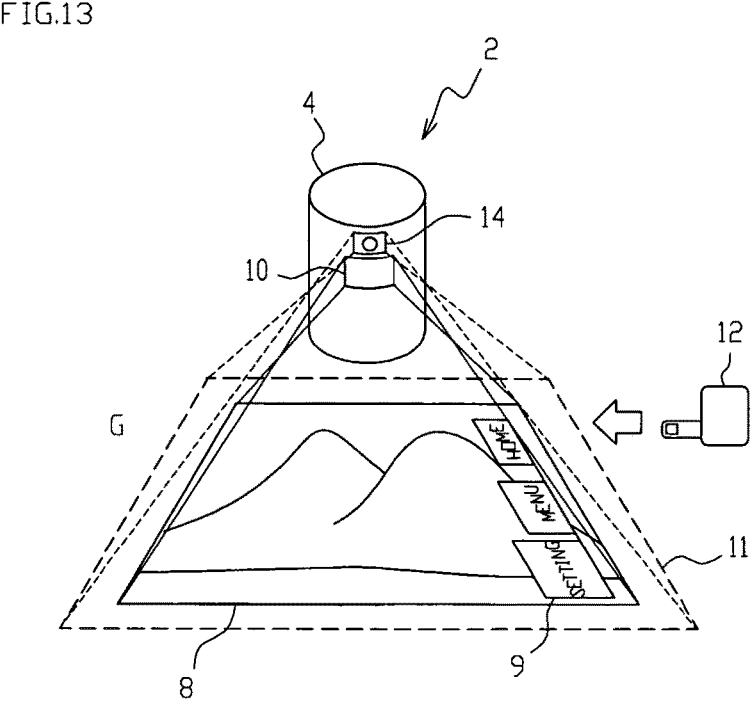
FIG. 13 is a diagram depicting the operation icons superimposed and projected onto the projected image by the projector according to the first embodiment, as well as the direction of approach of a hand.
Figure 14:
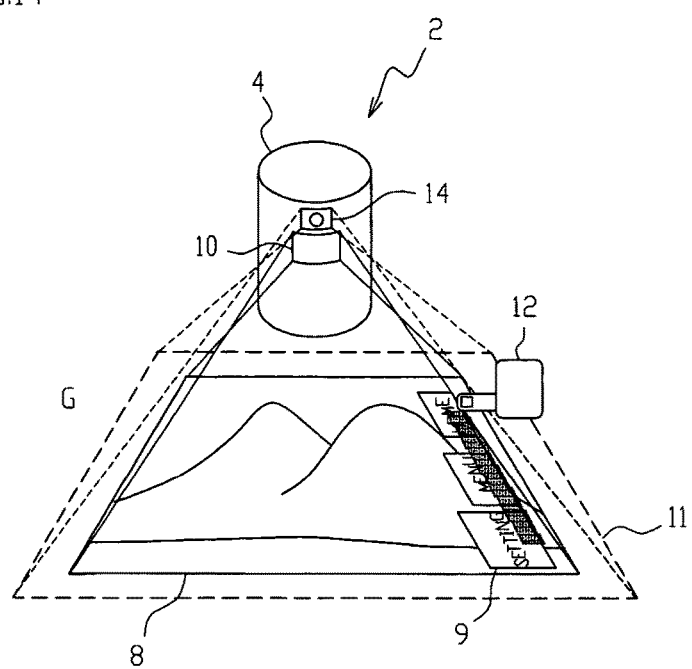
FIG. 14 is a diagram depicting the operation icons superimposed and projected onto the projected image by the projector according to the first embodiment.

Also, in the first embodiment, when the operation icons 9 are projected along the projection direction as depicted in FIG. 6, each of the operation icons 9 projected onto the projected image 8 has a uniform size, and the display gaps between the operation icons 9 are equivalent, but the sizes and display gaps of the operation icons 9 may be made to be different. For example, in step S5, the sizes and display gaps of the operation icons 9 may be decided on the basis of the distance from the projection window 10, such that, as depicted in FIG. 13, large-sized operation icons 9 are projected onto the front of the projected image 8 (see FIG. 5), and small-sized operation icons 9 are projected onto the rear, with the display gaps becoming narrower towards the front. The operation icons 9 located at the region shaded by the hand 12 as depicted in FIG. 14 can thereby be made to be further easier to be seen.

Figure 15:
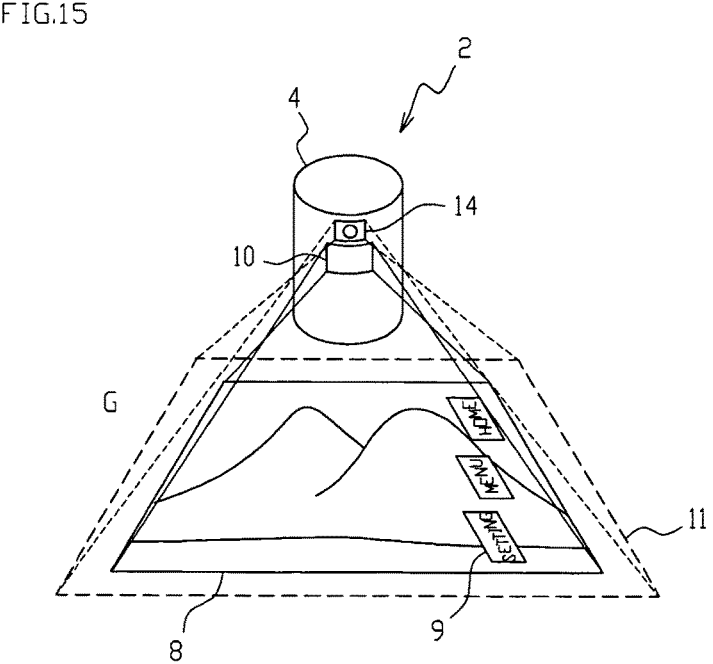
FIG. 15 is a diagram depicting the operation icons superimposed and projected onto the projected image by the projector according to the first embodiment.

Also, in the first embodiment, when the operation icons 9 are projected along the projection direction as depicted in FIG. 6, the distance from the edge part of the projected image 8 on the side in which the hand 12 approaches until the projection position of the operation icons 9 is uniform, but, as depicted in FIG. 15, the operation icons 9 may be made to be projected at positions increasingly removed from the edge part of the projected image 8 on the side in which the hand 12 approaches as the positions of the operation icons 9 become farther and farther away from the projection window 10. The operation icons 9 at the front of the projected image 8 (see FIG. 5) can thereby be prevented from being shaded by the hand 12 when an operation icon 9 located at the rear of the projected image 8 is indicated by the fingertip. Also, even in this case, the display gaps between the operation icons 9 may be made to be narrower towards the front (see FIG. 5).

Also, in the first embodiment, the region of the hand 12 and the position of the fingertips are detected from the image data such that a determination is made in the hand recognition unit 36 as to whether or not the image that is based on the image data contains the shape of the hand 12, but the region of an indication rod or the like and the position of the tip thereof may be detected so as to determine whether or not the image that is based on the image data contains the shape of the indication rod or the like. The operation icons 9 can be thereby projected onto the projected image 8 even when an indication member other than the hand 12 approaches the photography region 11.

Figure 16:
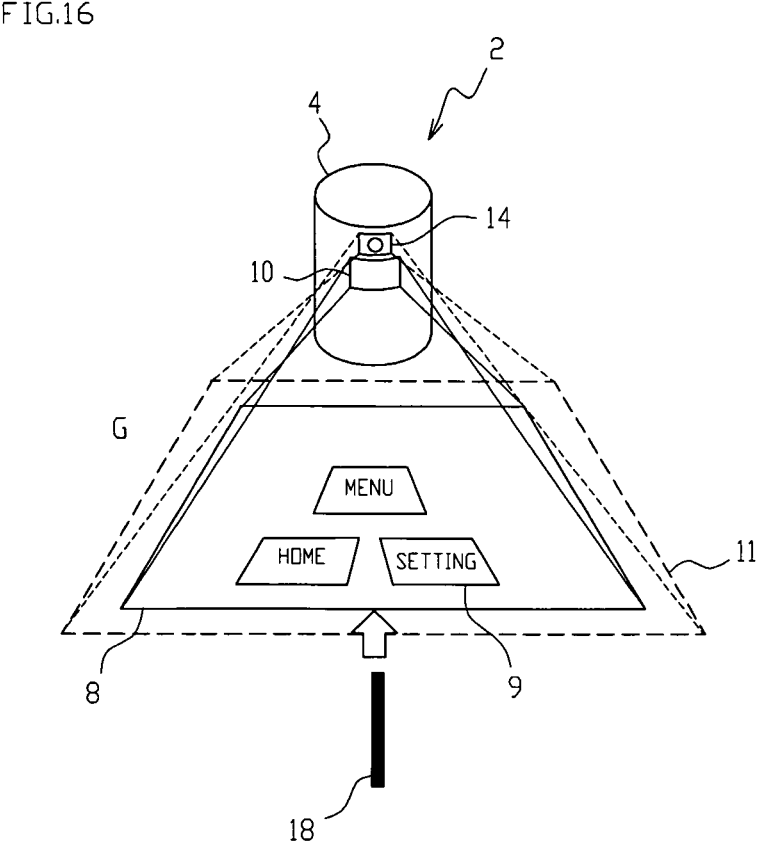
FIG. 16 is a diagram depicting the operation icons superimposed and projected onto the projected image by the projector according to the first embodiment.

Also, when a thin member such as an indication rod or the like is used to indicate an operation icon 9, the operation icons 9 in the shadow of the indication rod or the like will not become difficult to be seen. Therefore, when the image that is based on the image data contains the shape of the indication rod or the like, as depicted in FIG. 16, the operation icons 9 may be made to be projected around the position of the tip of the indication rod or the like 18, so as to have superior operability. The size of the operation icons 9 may also be altered to a smaller size and the operation icons 9 may be projected at narrower display gaps. The operation icons 9 can thereby be indicated without major movement of the indication rod or the like 18, when the projector 2 is operated with an indication rod or the like 18 which is less likely to shade the projected image 8.

Figure 17:
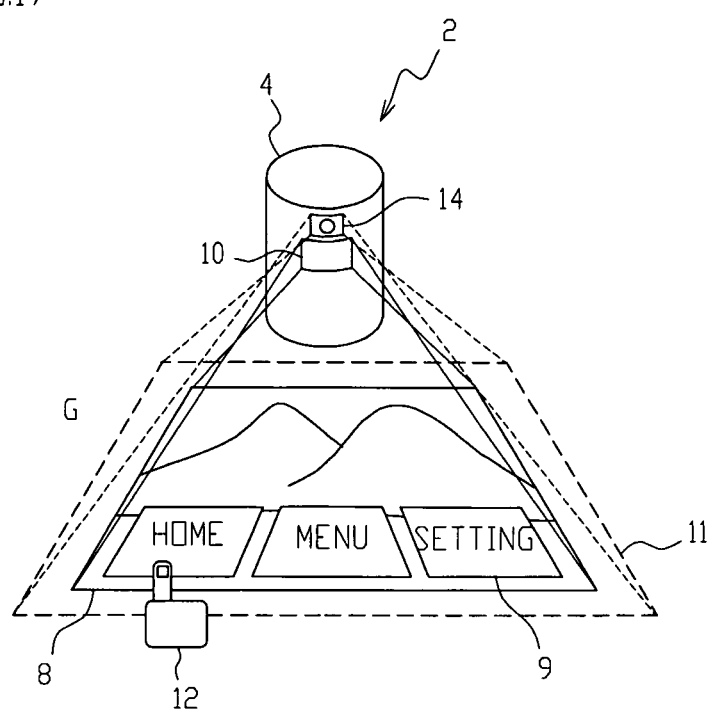
FIG. 17 is a diagram depicting the operation icons superimposed and projected onto the projected image by the projector according to the first embodiment.

Further, in the first embodiment, when the distance X of the normal direction (see FIG. 8(*b*)) is a given distance or less, the operation icon 9 positioned directly under the fingertip is altered to a larger size, but as depicted in FIG. 17, all the operation icons 9 projected onto the projected image 8 may be altered to a larger size.

Moreover, in the first embodiment, the size and display gaps of the operation icons 9 are decided in step S5, but only one of either the size or the display gaps of the operation icons 9 may also be decided.

Further, the first embodiment has been described taking the example of a case in which the operation icons 9 are superimposed and projected onto the projected image 8, but the projector 2 may be provided with an auxiliary projection unit that projects the operation icons 9, in addition to the projection unit 34, such that the auxiliary projection unit projects the operation icons 9 onto a region different from the projected image 8—for example, an adjacent region. In this case, because the operation icons 9 will not be shaded by the hand 12, the operation icons 9 are further easier to be seen, and further favorable operation is possible.

Moreover, in this case, the icons 9 may be projected onto the region adjacent to the projected image 8 at sizes and display gaps that vary in accordance with the direction in which the hand 12 approaches the photography region 11 (see FIG. 5). Also, when the operation icons 9 are projected along the projection direction (see FIG. 6), large-sized operation icons 9 may be projected at narrow gaps at the front or the rear of the region adjacent to the projected image 8 (see FIG. 5), and small-sized operation icons 9 may be projected at wide gaps on the left or the right side. Further, when the operation icons 9 are projected along the projection direction (see FIG. 6), the operation icons 9 may be projected at positions increasingly away from the edge part of the region adjacent to the projected image 8 as the position of the operation icons 9 is farther and farther away from the projection window 10.

Also, when the image data contains the shape of the indication rod or the like, small-sized operation icons 9 may be projected at narrow gaps around the position corresponding to the tip of the indication rod or the like 18 in the region adjacent to the projected image 8. The sizes of the operation icons 9 may also be altered to be a larger size when the fingertip comes close to the mounting surface G.

The projected image 8 and operation icons 9 may also be projected side by side in a single region. For example, a single region may be partitioned into two in order to project the projected image 8 on one side and project the operation icons 9 on another side.

Further, in the first embodiment, the projected image is projected onto the mounting surface G of the desk 6, but the projected image may also be projected onto another level surface such as a wall or floor. Projection may also be done onto a curved surface body such as a ball, or onto a moving object or the like.

Figure 18:
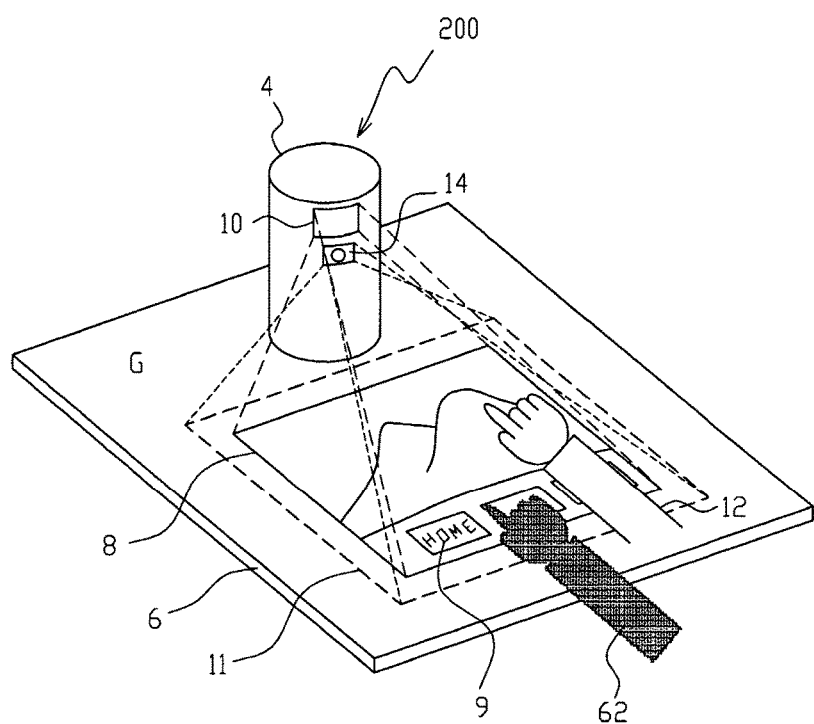
FIG. 18 is a perspective view depicting a projected state and a photographed state of a projector according to a second embodiment.
Figure 19:
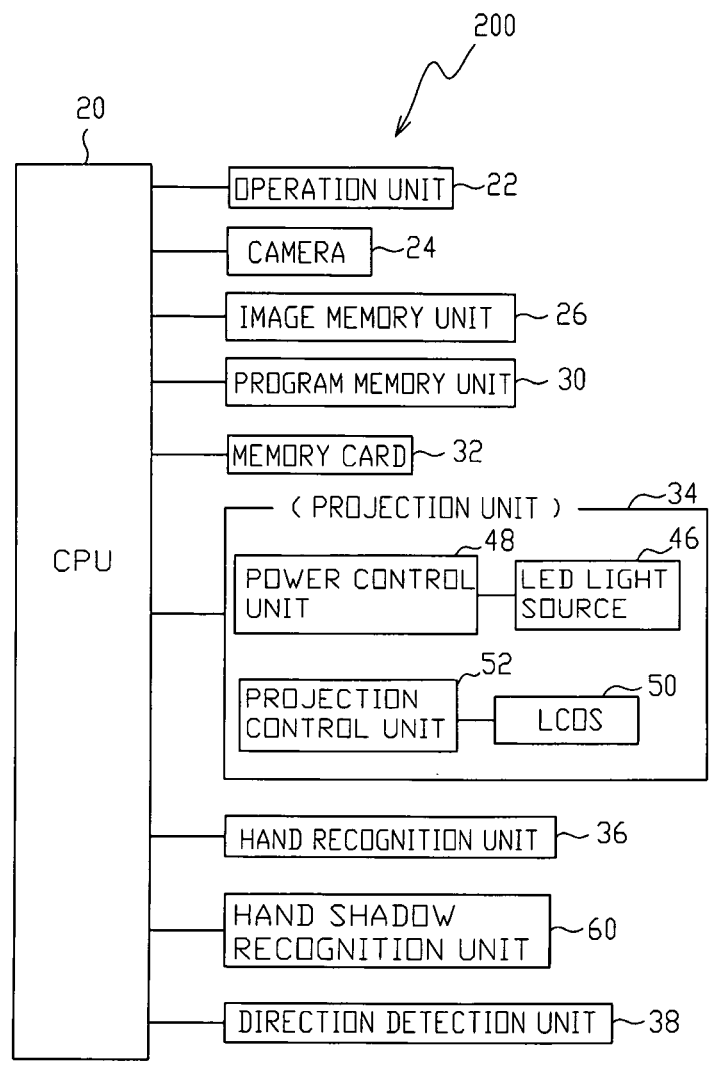
FIG. 19 is a block diagram depicting the configuration of the projector according to the second embodiment.

The following is a description of a projector according to a second embodiment. Note that under the projection window 10 on the front surface of the casing 4 of the projector 200, the projector according to the second embodiment is provided with a photography window 14 that photographs the shadow 62 of the hand, as depicted in FIG. 18. Further, as depicted in the block diagram of FIG. 19, the projector 2 according to the first embodiment is additionally provided with a hand shadow recognition unit 60 that determines whether or not a photographed image contains the shape of the shadow 62 of a hand, and furthermore the direction detection unit 38 is additionally provided with a function of detecting the direction in which the shadow 62 of the hand approaches the photography region 11. Accordingly, a more detailed description of those parts of the configuration that are identical to the first embodiment having been omitted, a description is provided only for the points of different.

Further, the same reference numerals are applied to describe the parts of the configuration that are the same as the first embodiment.

Figure 20:
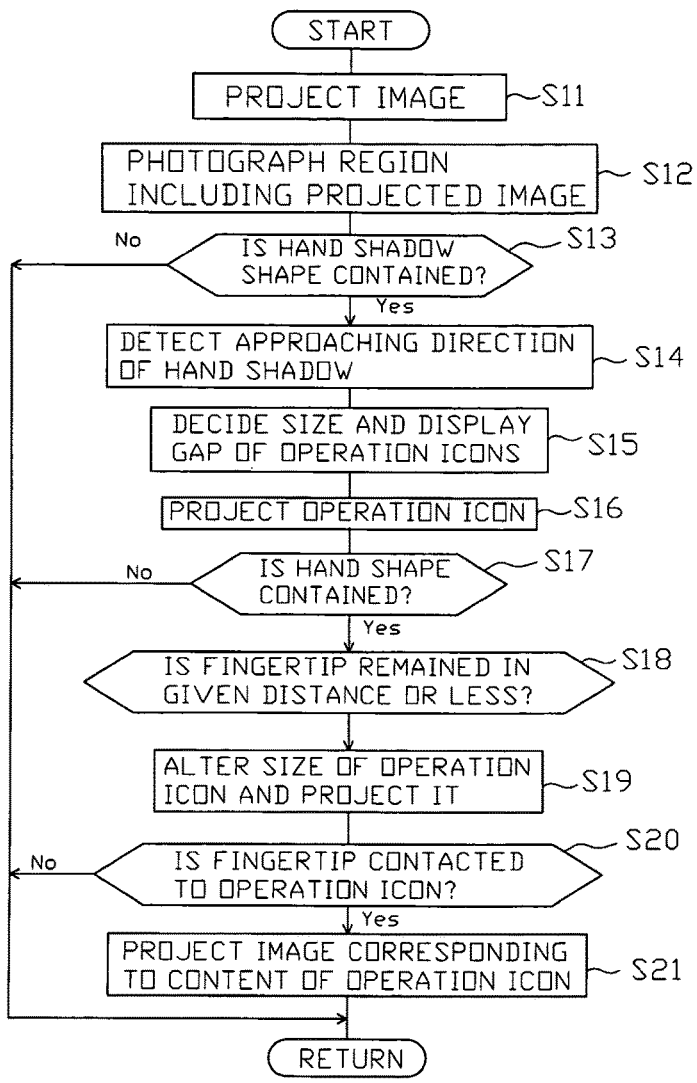
FIG. 20 is a flow chart depicting a process in the projector according to the second embodiment.
Figure 21:
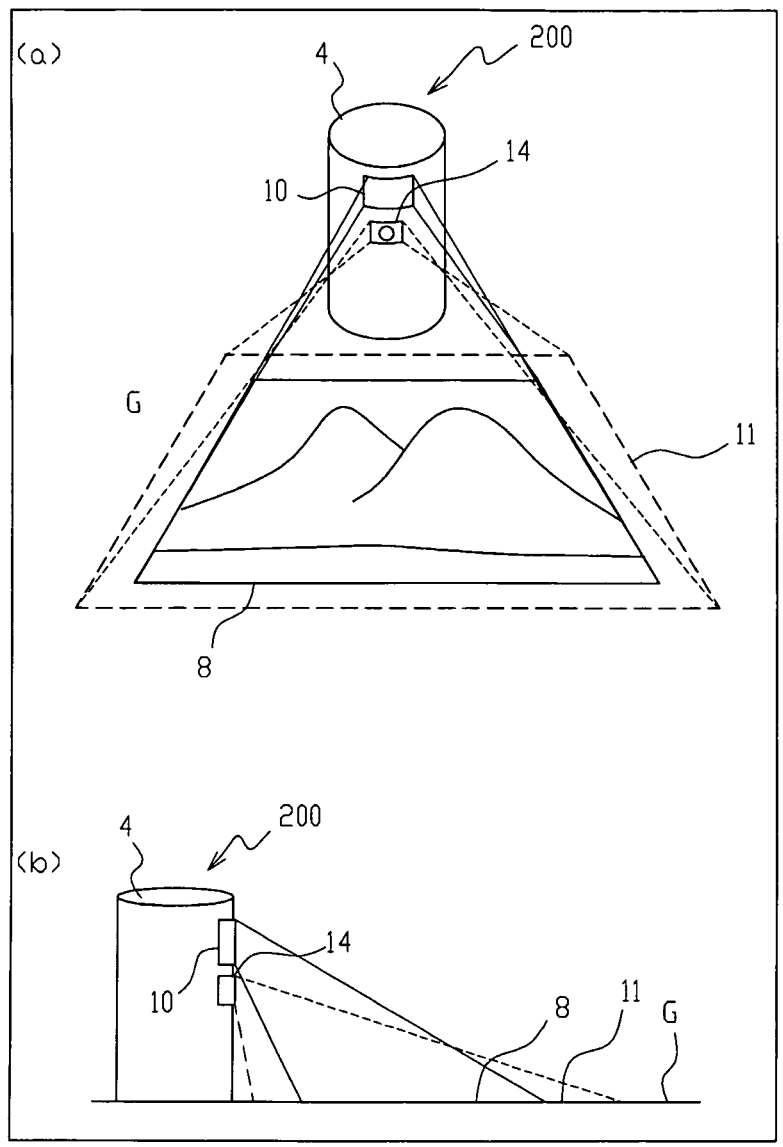
FIG. 21 is a front view and a side view depicting the projected state and the photographed state of the projector according to the second embodiment.

The following is a description of the process in a projector 200 according to the second embodiment, with reference to the flow chart illustrated in FIG. 20. First, as depicted in FIG. 21(*a*), the casing 4 is mounted onto a mounting surface G, and when the power is switched on, the CPU 20 emits projection light in a downward-sloping direction from the projection window 10 to project the projected image 8 onto the mounting surface G, as depicted in FIGS. 21(*a*) and 21(*b*) (step S11).

Next, the CPU 20 uses the camera 24 to begin photographing the photography region 11, which contains the projected image 8 (step S12). Herein, the camera 24 photographs using video photography or still image photography at fixed time intervals, and image data of the image photographed by the camera 24 is stored in the image memory unit 26.

Next, the CPU 20 reads out the image data from the image memory unit 26 and uses the hand shadow recognition unit 60 to determine whether or not the image that is based on the image data contains the shape of the shadow 62 of the hand (step S13). Herein, whether or not the image that is based on the image data contains the shape of the shadow 62 of the hand is determined to detect the region in the shadow 62 of the hand and the position corresponding to the fingertip in the region in the shadow 62 of the hand, from the image that is based on the image data by using pattern matching or the like.

When the image that is based on the image data contains the shape of the shadow 62 of the hand (step S13: Yes), the CPU 20 uses the direction detection unit 38 to detect from which direction, depicted in FIG. 5, the shadow 62 of the hand approached the photography region 11 (step S14). On the other hand, when the image that is based on the image data does not contain the shape of the shadow 62 of the hand (step S13: No), the CPU 20 returns to the process of step S11 without detecting the direction in which the shadow 62 of the hand approached.

Next, the CPU 20 determines whether the direction of approach of the shadow 62 of the hand belongs to the front-rear direction or the left-right direction depicted in FIG. 5, and then decides the size and display gaps of the operation icons 9 on the basis of the determined results (step S15).

Figure 22:
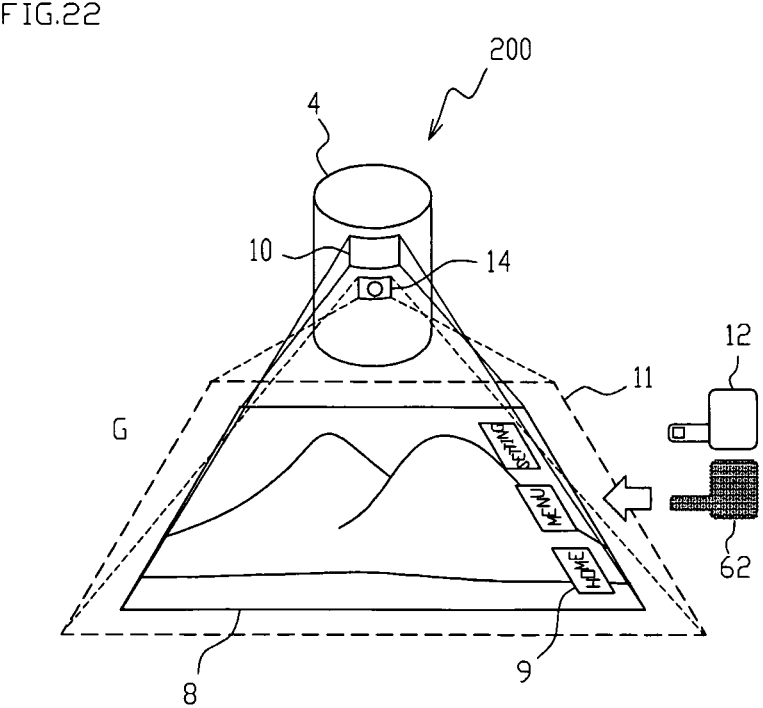
FIG. 22 is a diagram depicting operation icons superimposed and projected onto a projected image by the projector according to the second embodiment, as well as a direction of approach of the shadow of a hand.
Figure 23:
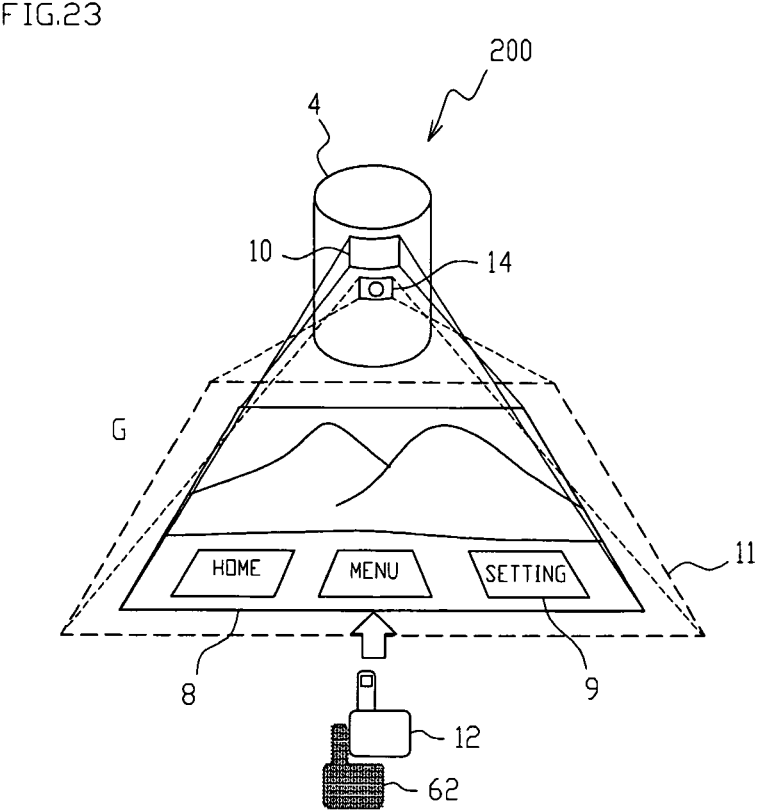
FIG. 23 is a diagram depicting the operation icons superimposed and projected onto the projected image by the projector according to the second embodiment, as well as the direction of approach of the shadow of a hand.

Next, the CPU 20 reads out the image data of the operation icons 9 from the program memory unit 30, and indicates to the projection unit 34 to project the operation icons 9 at the sizes and display gaps decided in step S15, along the edge part of the side of the projected image 8 in which the shadow 62 of the hand approached (step S16). For example, as depicted in FIG. 22, when the shadow 62 of the hand approaches the photography region 11 from the right side, the operation icons 9 are projected along the edge part of the right side of the projected image 8 at the sizes and display gaps decided in step S15. Further, as depicted in FIG. 23, when the shadow 62 of the hand approaches the photography region 11 from the front, the operation icons 9 are projected along the edge part of the front of the projected image 8 at the sizes and display gaps decided in step S15.

Next, the CPU 20 uses the hand recognition unit 36 to determine whether or not the image that is based on the image data contains the shape of the hand 12 (step S17). When the image that is based on the image data does not contain the shape of the hand 12 (step S17: No), process returns to that of step S11. On the other hand, when the image that is based on the image data does contain the shape of the hand 12 (step S17: Yes), the CPU 20 determines whether or not the distance from the operation icons 9 to the fingertip is a given distance or less (step S18).

When the distance from the operation icons 9 to the fingertip is the given distance or less (step S18: Yes), the CPU 20 alters the size of the operation icon 9 located directly under the fingertip to a larger size, and uses the projection unit 34 to project the large-sized operation icon 9 (step S19). On the other hand, when the distance from the operation icons 9 to the fingertip is greater than the given distance (step S18: No), the CPU 20 returns to the process of step S11 without altering the size of the operation icons 9.

Next, the CPU 20 determines whether or not the fingertip has come into contact with the mounting surface G from the image data (step S20). For example, when the fingertip located above the icon 9 "SETTINGSS" comes into contact with the mounting surface G (see FIGS. 10(*a*) and 10(*b*); step S20: Yes), the CPU 20 indicates to the projection unit 34 to project an image "SETTINGS SCREEN" for setting, for example, the brightness of the projected image 8, corresponding to the content of the operation icon 9 "SETTINGS" (step S21). On the other hand, when the fingertip does not come into contact with the mounting surface G (step S20: No), the CPU 20 returns to the process of step S11 without projecting an image corresponding to the content of the operation icon 9.

According to the projector 200 based on this second embodiment, because the direction detection unit 38 detects the direction in which the shadow 62 of the hand approaches the photography region 11, the icons 9 can therefore be projected on the basis of the direction of approach of the shadow 62 of the hand, even when, for example, the position (height) of the hand 12 is separated from the mounting surface G and the hand 12 does not approach the photography region 11. Since the icons 9 are therefore projected earlier, the operator can select the operation icon 9 well in advance. Further, because the icons 9 are projected at different sizes and display gaps in accordance with the direction of approach of the shadow 62 of the hand, the operation icons 9 are easy to be seen and favorable operation is possible, similar to the first embodiment, even in the region shaded by the hand 12.

Note that in the second embodiment, the width from the edge part of the projected image 8 to the edge part of the photography region 11 may be made to vary depending on the directions of the edge parts. For example, as depicted in FIG. 11, the width of A may be made to be narrower than the width of B. Also, as depicted in FIG. 12, the width from the edge part of the projected image 8 to the edge part of the photography region 11 may be made to become narrower as the distance from the casing 4 increases. The operation icons 9 being thereby projected prior to when the projected image 8 is shaded by the hand 12 when the shadow 62 of the hand approaches from the right, the left, or the rear of the photography region 11 (see FIG. 5), the operator can recognize the position of the operation icons 9 earlier. Also, because the operation icons 9 located at the front of the projected image 8, which is less prone to being shaded by the hand 12 (see FIG. 5), are not projected until immediately before the shadow 62 of the hand approaches the projected image 8, mistaken operations, such as when the operation icons 9 are projected when the hand 12 mistakenly comes close to the mounting surface G, can be prevented. Note that when the photography region 11 remains in the original state (see FIG. 10(*a*) and the like), the region in which the hand shadow recognition unit 60 determines whether or not the image that is based on the image data contains the shape of the shadow 62 of the hand may be altered like the photography region 11 depicted in FIGS. 11 and 12.

Figure 24:
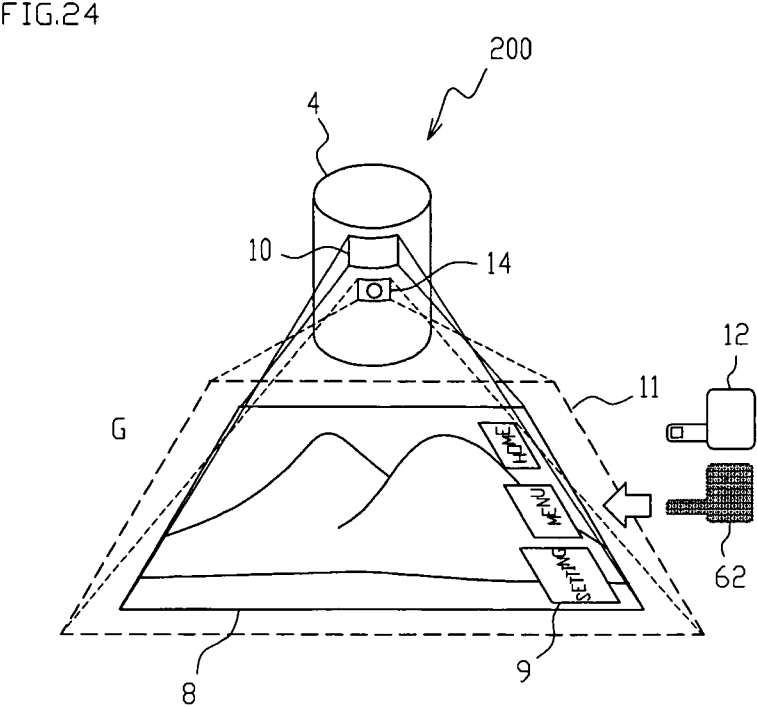
FIG. 24 is a diagram depicting the operation icons superimposed and projected onto the projected image by the projector according to the second embodiment, as well as the direction of approach of the shadow of a hand.
Figure 25:
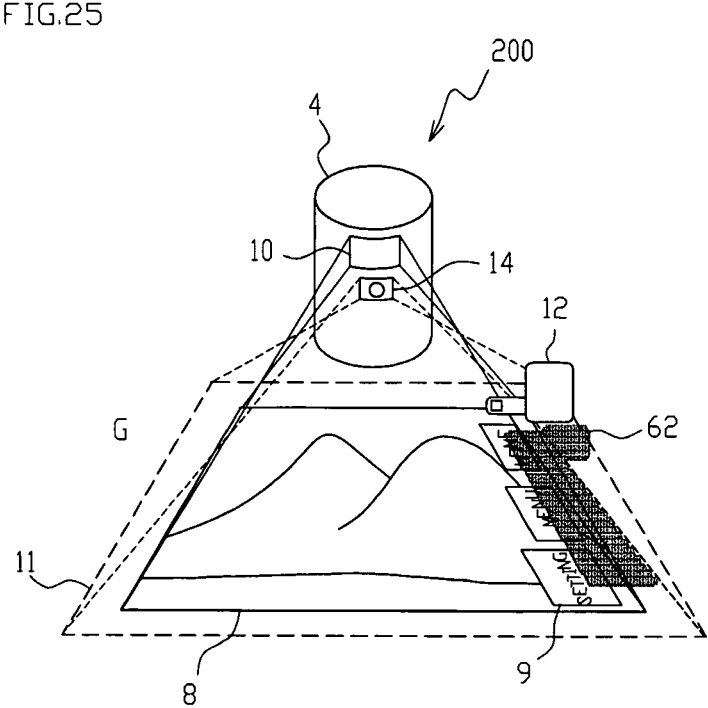
FIG. 25 is a diagram depicting the operation icons superimposed and projected onto the projected image by the projector according to the second embodiment.

Also, in the second embodiment, when the operation icons 9 are projected along the projection direction as depicted in FIG. 22, each of the operation icons 9 projected onto the projected image 8 has a uniform size, and the display gaps between the operation icons 9 are equivalent, but the sizes and display gaps of the operation icons 9 may be made to be different. For example, in step S15, the sizes and display gaps of the operation icons 9 may be decided on the basis of the distance from the projection window 10, such that, as depicted in FIG. 24, large-sized operation icons 9 are projected onto the front of the projected image 8 (see FIG. 5), and small-sized operation icons 9 are projected onto the rear thereof, with the display gaps becoming narrower towards the front. The operation icons 9 located at the region shaded by the hand 12 as depicted in FIG. 25 can thereby be made to be further easier to be seen.

Figure 26:
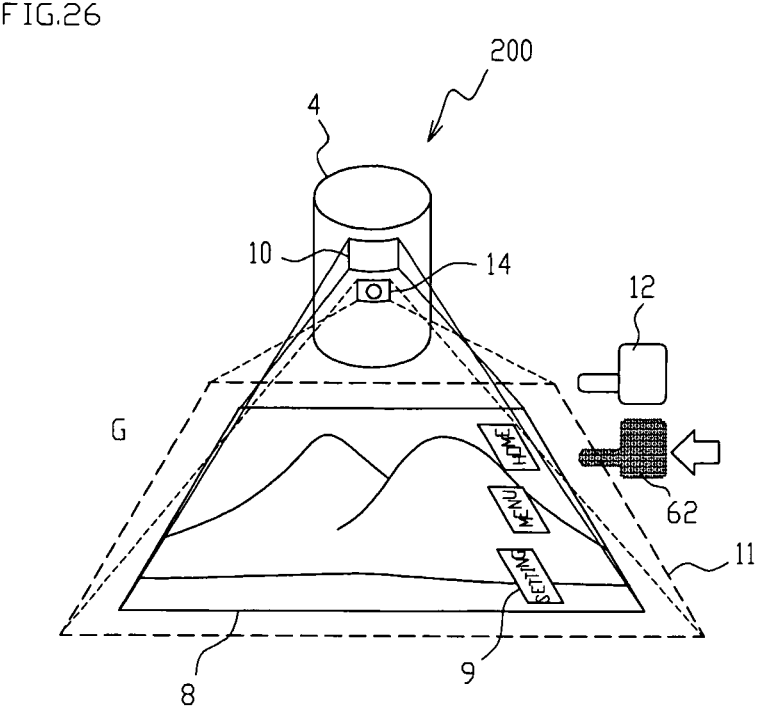
FIG. 26 is a diagram depicting the operation icons superimposed and projected onto the projected image by the projector according to the second embodiment, as well as the direction of approach of the shadow of a hand.

Also, in the second embodiment, as depicted in FIG. 26, the operation icons 9 may be made to be projected at positions increasingly away from the edge part of the projected image 8 on the side in which the shadow 62 of the hand approaches as the positions of the operation icons 9 become farther and farther away from the projection window 10. The operation icons 9 at the front of the projected image 8 (see FIG. 5) can thereby be prevented from being shaded by the hand 12 when an operation icon 9 located at the rear of the projected image 8 is indicated by the fingertip. Also, even in this case, the display gaps between the operation icons 9 may be made to be narrower towards the front (see FIG. 5).

Also, in the second embodiment, the hand shadow recognition unit 60 may determine whether or not the image that is based on the image data contains the shadow of the indication rod or the like. The operation icons 9 can thereby be projected onto the projected image 8 even when the shadow of an indication member other than the hand 12 approaches the photography region 11.

Figure 27:
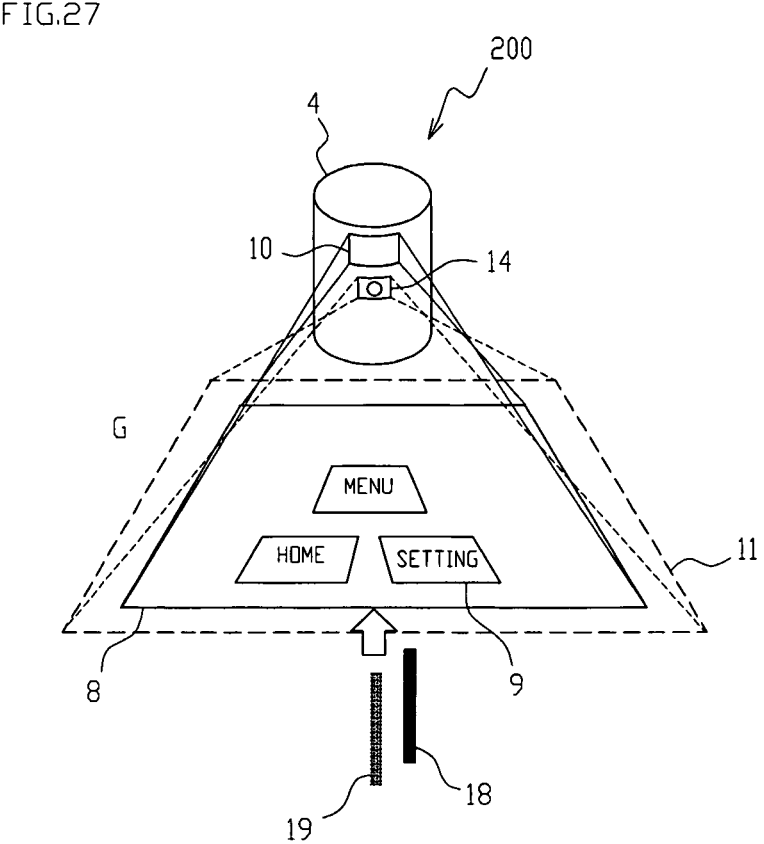
FIG. 27 is a diagram depicting the operation icons superimposed and projected onto the projected image by the projector according to the second embodiment.

Also, when a thin member such as an indication rod or the like is used to indicate an operation icon 9, the operation icons 9 in the shadow of the indication rod or the like will not become difficult to be seen. Therefore, when the image that is based on the image data contains the shadow of the indication rod or the like, as depicted in FIG. 27, the operation icons 9 may be made to be projected around the position of the tip of the shadow 19 of the indication rod or the like, so as to have superior operability. The size of the operation icons 9 may also be altered to a smaller size and the operation icons 9 may be projected at narrower display gaps. The operation icons 9 can thereby be indicated without major movement of the indication rod or the like 18, when the projector 200 is operated with an indication rod or the like 18 which is less likely to shade the projected image 8.

Further, the second embodiment has been described taking the example of a case in which the operation icons 9 are superimposed and projected onto the projected image 8, but the projector 200 may be provided with an auxiliary projection unit that projects the operation icons 9, in addition to the projection unit 34, such that the auxiliary projection unit projects the operation icons 9 onto a region different from the projected image 8—for example, an adjacent region. In this case, because the operation icons 9 will not be shaded by the hand 12, the operation icons 9 are further easier to be seen, and further favorable operation is possible.

The projected image 8 and operation icons 9 may also be projected side by side in a single region. For example, a single region may be partitioned into two in order to project the projected image 8 on one side and project the operation icons 9 on another side.

Figure 28:
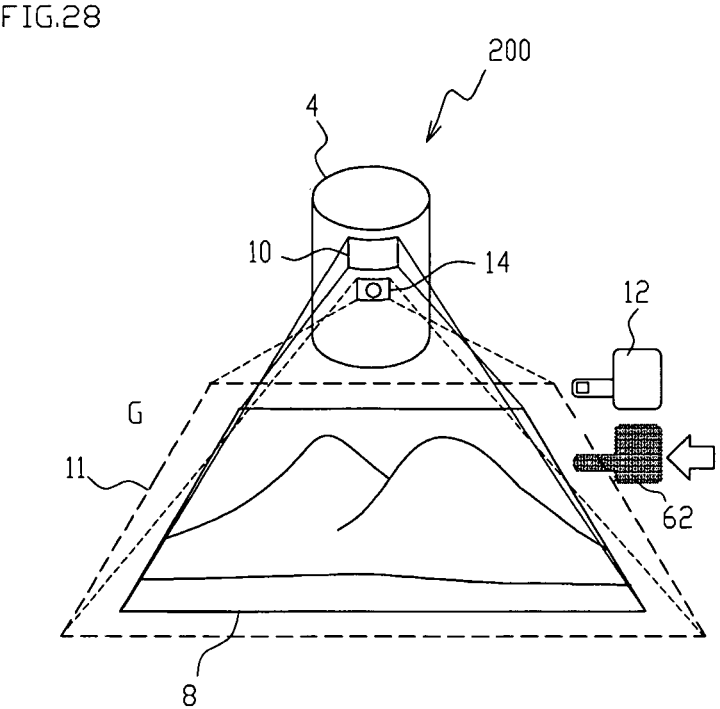
FIG. 28 is a diagram depicting the operation icons superimposed and projected onto the projected image by the projector according to the second embodiment, as well as the direction of approach of the shadow of a hand.

Further, in the second embodiment, after the photography of the photography region 11 has begun (step S12), the hand recognition unit 36 may be made to determine whether or not the image data contains image data corresponding to the shape of the hand 12. Herein, when the image data does contain image data corresponding to the shape of the hand 12, the CPU 20 uses the direction detection unit 38 to detect from which of the directions depicted in FIG. 5 the hand 12 has approached the photography region 11, and then determines whether the direction of approach belongs to the front-rear direction or the left-right direction illustrated in FIG. 5. Then, after the direction of approach of the hand 12 has been determined, the hand shadow recognition unit 60 may be used to determine whether or not the image data contains image data corresponding to the shape of the shadow 62 of the hand (step S13). The CPU 20 is thereby able to project operation icons 9 when, as depicted in FIG. 25, the hand 12 approaches the photography region 11 and also the shadow 62 of the hand approaches the photography region 11. Note that in this case, as depicted in FIG. 28, the operation icons 9 are not projected when the hand 12 does not approach the photography region 11, even though the shadow 62 of the hand may have approached it, and therefore, for example, it is possible to prevent mistaken operations, such as the projection of the operation icons 9 when the operator has mistakenly brought the hand 12 close to the projector 200.

Figure 29:
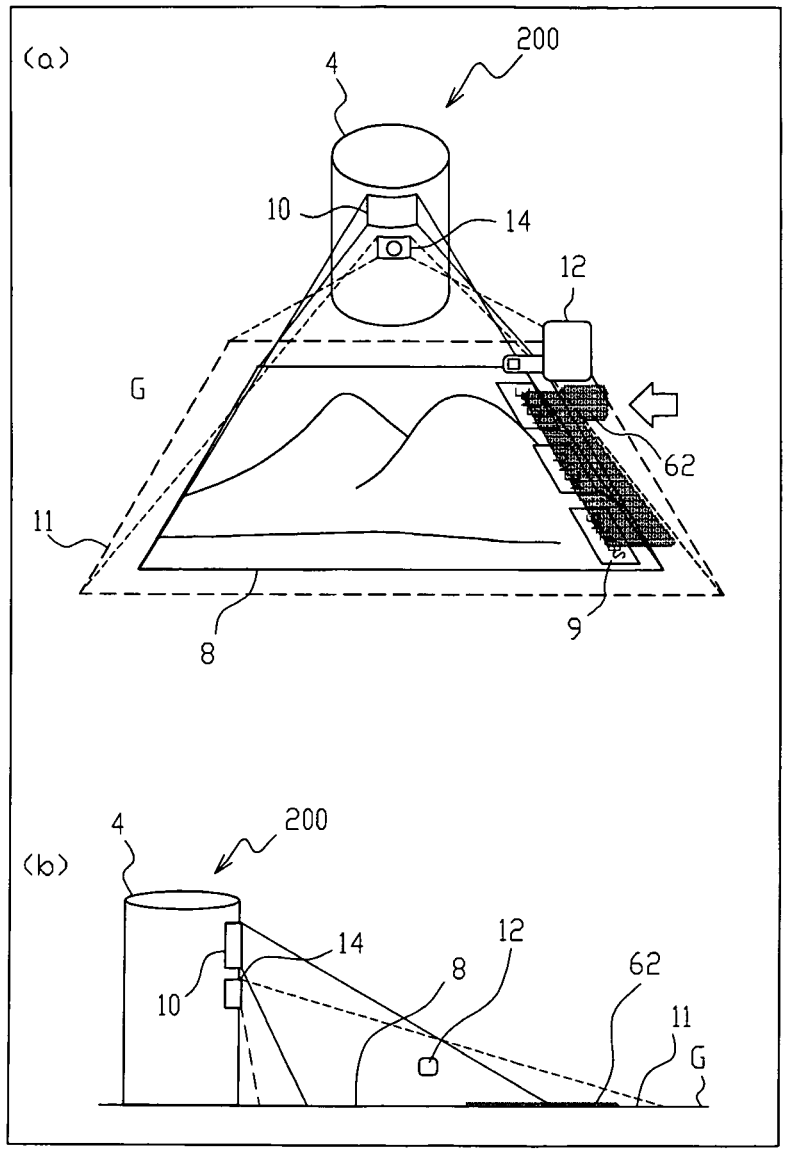
FIG. 29 is a diagram depicting the operation icons superimposed and projected onto the projected image by the projector according to the second embodiment, as well as the direction of approach of the shadow of a hand.
Figure 30:
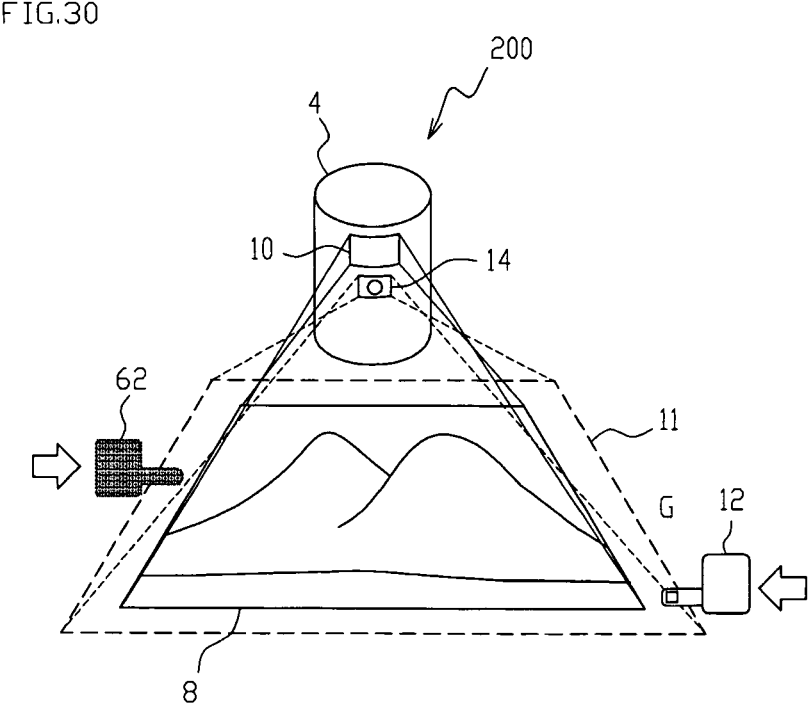
FIG. 30 is a diagram depicting the projected image projected by the projector according to the second embodiment, as well as the direction of approach of the shadow of a hand.

In this case, the operation icons 9 may be made to be projected only when the position of the shadow 62 of the hand, having approached the photography region 11, is located on an extension of the position of the hand 12 in the projection direction. For example, as depicted in FIG. 29(*a*), the hand 12 and the shadow 12 of the hand have approached the photography region 11. In this case, as depicted in FIG. 29(*b*)B, the icons 9 are projected when the position of the shadow 12 of the hand is located on an extension of the position of the hand 12 in the projection direction. On the other hand, as depicted in FIG. 30, in a case such as when the hand 12 and the shadow 62 of the hand approach the photography region 11 from different directions, the position of the shadow 62 of the hand is not located on an extension of the position of the hand 12 in the projection direction, and therefore the operation icons 9 are not projected. It is thereby possible to prevent mistaken operations, such as the projection of the operation icons 9 in a case in which someone other than the operator has mistakenly brought a hand 12 close to the projector 200 and the shadow 62 of the hand based on illumination light other than the projection light approaches the photography region 11 (see FIG. 30), or the like, thus allowing the projector 200 to have enhanced operability.

The above-described embodiments have been recited in order to facilitate understanding of the present invention, and are not recited in order to limit the present invention. Accordingly, in effect, each element disclosed in the above-described embodiments also includes all design changes and equivalents falling within the technical scope of the present invention.

The invention claimed is:

1. A projector, comprising:
a projection unit comprising a light source that projects a plurality of icons that is an image for indicating an operation displayed;
an imaging sensor that photographs a region in which the icons are projected by the projection unit;
a detection unit that detects the direction of approach of an indication member or of the shadow of the indication member based on an image of the region photographed by the imaging sensor; and
a controller that controls the projection unit to project by changing positions to project icons in the region based on a projection direction of the projection unit and the direction of approach of the indication member or of the shadow of the indication member detected by the detection unit,
wherein the controller controls the projection unit to project by changing sizes of the icons projected respectively in the region based on distance from the projection unit.

2. The projector according to claim 1,
wherein in response to determining the direction of approach detected by the detection unit belongs to the direction along the projection direction, the decision unit makes the display sizes of the icons when the icons are projected along the projection direction of the projection unit smaller than the display sizes of the icons when the icons are projected along the direction orthogonal to the projection direction of the projection unit, and the display gaps between the icons when the icons are projected along the projection direction of the projection unit wider than the display gaps between the icons when the icons are projected along a direction crossing the projection direction.

3. The projector according to claim 1, wherein a first region, in which the detection unit detects the direction of approach, is larger than a second region, in which the projection unit projects the icons.

4. The projector according to claim 3,
wherein a width of the first region grows wider as the distance from the projection unit decreases.

5. The projector according to claim 1, further comprising:
a shape recognition unit that recognizes the shape of the indication member or the shape of the shadow of the indication member; and
an alteration unit that alters at least one of the display sizes of the icons, the display gaps between the icons, and the display positions of the icons, on the basis of the shape of the indication member or of the shape of the shadow of the indication member.

6. The projector according to claim 1,
wherein the sizes of the icons when the icons are projected along the projection direction are smaller than the sizes of the icons when the icons are projected along a direction which is different from the projection direction.

7. The projector according to claim 1, wherein the sizes of the icons grow larger as the distance from the projection unit increases.

8. The projector according to claim 1, wherein gaps between the icons change based on the distance from the projection unit.

9. The projector according to claim 8,
wherein the gaps between the icons when the icons are projected along the projection direction are wider than the gaps between the icons when the icons are projected along a direction which is different from the projection direction.

10. The projector according to claim 1, wherein the projection unit projects an image and superimposes the icons onto the image.

11. The projector according to claim 10, wherein the decision unit:
measures the distance of the normal direction from the projection surface to the indication member; and
alters the given display sizes of the icons when the distance of the normal direction is a given distance or less when the indication member is located above the display position of a given icon.

12. The projector according to claim 10, wherein the controller changes the sizes of all the icons.

13. The projector according to claim 1, wherein the projection unit projects an image and projects the icons onto a region different from the image.

14. The projector according to claim 1,
wherein the controller projects the icons along the projection direction when the projection direction and the direction of approach is different.

15. A projector, comprising:
a projection unit comprising a light source that projects a plurality of icons that is an image for indicating an operation displayed;
an imaging sensor that photographs a region in which the icons are projected by the projection unit;
a detection unit that detects the direction of approach of an indication member or of the shadow of the indication member based on an image of the region photographed by the imaging sensor; and
a controller that controls the projection unit to project by changing positions to project icons in the region based on a projection direction of the projection unit and the direction of approach of the indication member or of the shadow of the indication member detected by the detection unit,
wherein display sizes of the icons grow larger or get smaller as distance from the projection unit increases.

16. The projector according to claim 15,
wherein gaps between the icons when the icons are projected along the projection direction are wider than the gaps between the icons when the icons are projected along a direction which is different from the projection direction.

17. The projector according to claim 15,
wherein a first region, in which the detection unit detects the direction of approach, is larger than a second region, in which the projection unit projects the icons, and
wherein a width of the first region grows wider as the distance from the projection unit decreases.

18. The projector according to claim 15,
wherein the controller controls the projection unit to project the icons along the projection direction when the projection direction and the direction of approach is different.

* * * * *